March 21, 1933.  C. L. EKSERGIAN  1,902,222
METHOD OF MAKING WHEEL HUBS
Filed May 28, 1929   2 Sheets-Sheet 1

INVENTOR.
CAROLUS L. EKSERGIAN
BY
*John P. Fordox*
ATTORNEY.

March 21, 1933.  C. L. EKSERGIAN  1,902,222
METHOD OF MAKING WHEEL HUBS
Filed May 28, 1929  2 Sheets-Sheet 2
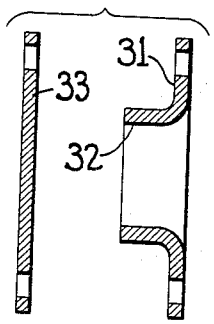
FIG.9  FIG.10
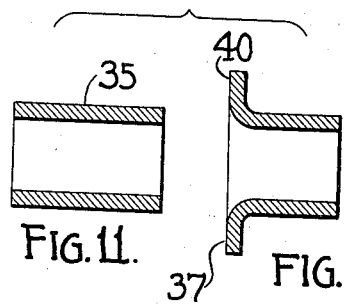
FIG.11.  FIG.12
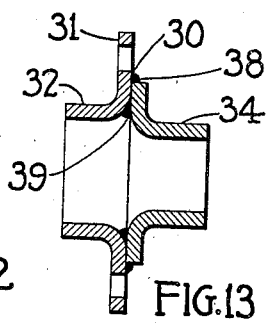
FIG.13
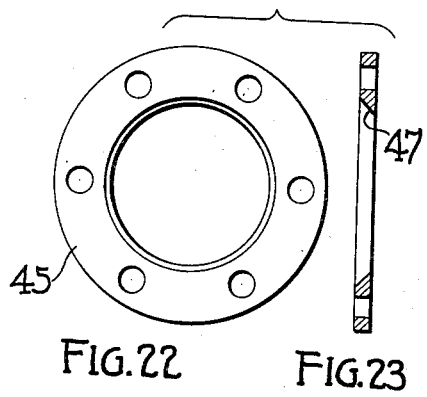
FIG.22  FIG.23
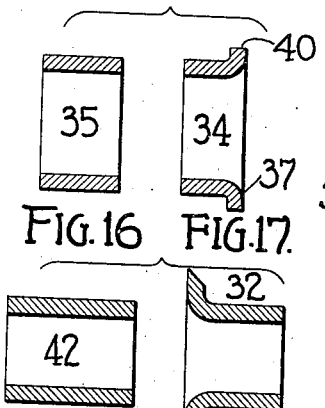
FIG.16  FIG.17
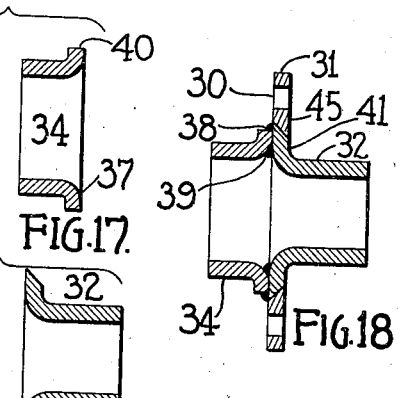
FIG.14  FIG.15
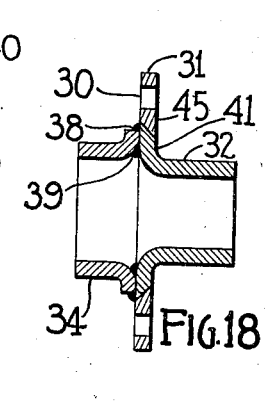
FIG.18
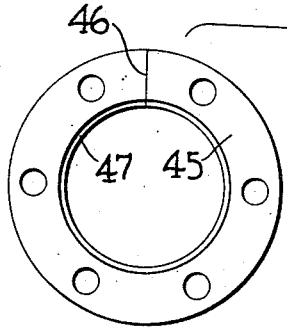
FIG.21.
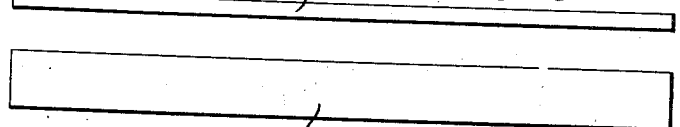
FIG.19
FIG.20
INVENTOR.
CAROLUS L. EKSERGIAN
BY
ATTORNEY.

Patented Mar. 21, 1933

1,902,222

UNITED STATES PATENT OFFICE

CAROLUS L. EKSERGIAN, OF DETROIT, MICHIGAN, ASSIGNOR TO BUDD WHEEL COMPANY, OF PHILADELPHIA, PENNSYLVANIA, A CORPORATION OF PENNSYLVANIA

METHOD OF MAKING WHEEL HUBS

Application filed May 28, 1929. Serial No. 366,549.

The fabrication of relatively heavy hubs such as used on automotive vehicles from tubes has had considerable attention during the past years, but the number of practically usuable or commercially acceptable structures has been almost negligible. It is my principal aim to achieve such a hub structure possessing practicability and commercial utility to a high degree.

Divisions of the ultimate hubs in sections for the purpose of separate fabrication have heretofore been made in surfaces and lines which fail to avoid difficulties and complexities in the fabrication of the separate sections so produced. In some cases divisions have been far from economical of material. So too, have been the processes used for fabricating the individual sections. Yet others have been unadaptable to change in form and dimension incident to various axial and bearing conditions met with in practice.

I have as objects the elimination of such short-comings.

I divide the hub radially in the plane of one face of the flange of the hub, integrally form the flange and that part of the main body of the barrel lying on one side of the plane of division, and form the remaining section of the barrel as a tube which I rigidly secure to the first named section substantially in the plane of division. In the preferred form of my invention I initially integrally form the root only of the flange and that portion of the barrel lying on one side thereof, form the remainder of the flange as a ring rolled from strip stock, butt weld the ring to the root so formed on the section of barrel, and finally form the remaining section of the barrel on the opposite side of the plane of division as a tube and weld the tube to the first named section substantially at the cornice between the flange and the barrel of that section. Preferably the welded end of the tube is flared and the weld achieved in the plane of division. The nature of the welds, of course, may be varied as between butt welding, arc welding, spot welding and the like, depending upon the conditions met with but I prefer butt welding.

In the accompanying drawings I show several embodiments of my invention.

Figures 9 to 13 are axial sections of a second modification,

Figures 14 to 18 are axial sections of a third modification,

Figures 19 and 20 are edge and plan views of a strip of which the body of the flange of this form is made, Figure 21 is an elevation of a flange ring made from the strip, and Figures 22 and 23 are plan and radial cross section respectively of such a flange stamped from a plate.

Figure 4:
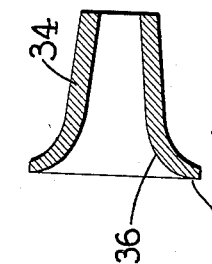
Figures 1 to 8 show one embodiment, the parts in the several steps of the method being shown in each case in axial cross section and Figure 8 showing the completed product manufactured according to my invention.
Figure 8:
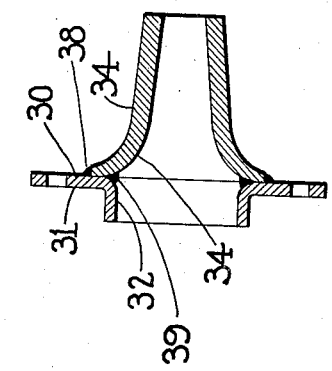
Figure 3:
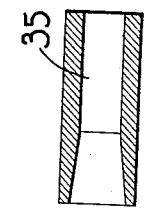
Figure 7:
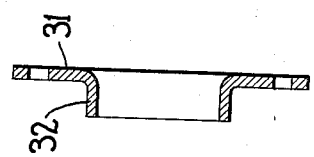
Figure 2:
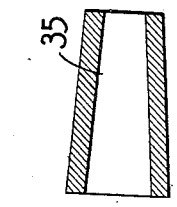
Figures 5, 6:
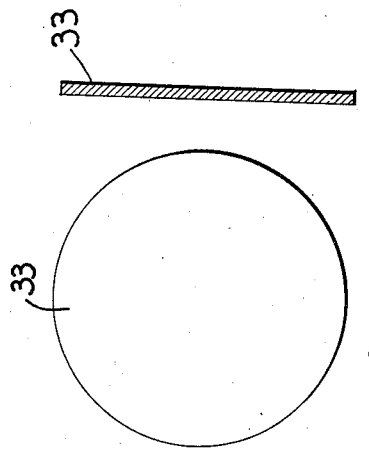
Figure 1:
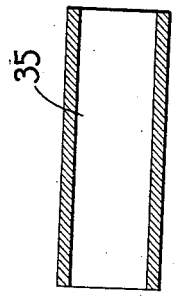

Referring first to the form of Figs. 1 to 8 it will be noted from Fig. 8 that the ultimate hub is divided for purposes of fabrication in the radial plane 30 of the face of the flange 31. This it will be noted by reference to Figs. 13 and 18 is also true of the other three forms illustrated. The flange 31 and that portion 32 of the barrel lying on one side of the plane of division 30 are formed integrally as shown in Figs. 5 to 7 of plate stock 33. In this embodiment of my invention they are die stamped therefrom as shown in Fig. 7. But, as will be seen, they may be forged, rolled, fabricated of tubular stock or otherwise. That section 34 of the hub barrel lying on the opposite side of the plane of division 30 I form from tubing, in this embodiment as indicated in Figs. 1 to 4. Here I cut from a length of preformed tubing a section 35 as shown in Fig. 1, I upset it and taper it as shown in Fig. 2, throughout its length, or else upset it and taper it through part of its length as shown in Fig. 3. Thereupon I outwardly flare its end of larger diameter on a wide curve 36 as shown in Fig. 4 to constitute it the remaining section 34 of the hub barrel and to give its outwardly flared end the radially extending surface 37 by means of which it may be secured to the flange 31 of the section shown in Fig. 7 in the radial plane of division 30. I then preferably butt weld the parts together. But I may rotary arc weld them as at 38 or both butt and arc weld them. Or I may apply arc welding additionally as shown at 39 joining the parts substantially at the cornice of flange 31 and barrel section 32. Other means of rigidly joining the parts together may be provided, but I prefer in this embodiment the rotary arc welding at the points 38—39 or both.

In the embodiment shown in Figs. 9 to 13, the flange 31 and the barrel section 32 are likewise integrally formed from plate stock 33 as shown in Figs. 9 and 10. But Figs. 11 and 12 show the tubular section to be made initially from thick wall tubing rather than relatively thin wall tubing. One end of the section of tubing is flared to form a radially extending flange 40 embodying the attaching and securing surface 37 of a greater radial extent than the surface 37 of the form of Fig. 8. Such a surface is more adapted for spot or spud welding or for riveting. Yet I still prefer the arc welding designated at 38 and 39 in the securing of these hub sections 32 and 34 together.

The form of Figs. 14 to 21 differs from those of Figs. 1 to 13 in the two forms of Figs. 1 to 8 and 9 to 13 principally in the steps of fabrication of the flanged barrel section 32. Whereas this section in the two prior forms is constituted the inboard section of the hub and given the greater barrel diameter, in this embodiment it is constituted the outboard barrel section and given the smaller diameter. In its fabrication the root 41 only of the flange 31 is integrally formed with it. Preferably it is formed from a section of tubing 42 shown in axial cross section in Fig. 14 one end of which is flared as shown in Fig. 15 to constitute the root 41 of the flange. This root 41 is provided with a beveled seat 43 to receive the butt weld of the remaining portion of the flange. The remaining portion of the flange 31 is formed from a strip 44 shown in Figs. 19 and 20, which strip is rolled edgewise into a ring 45 the ends of which are butt welded together at 46. This ring has a complemental bevel seat 47 which is engaged with the seat 43 of the root 41 on the part 42 and butt welded thereto. The completed section 31—32 is then ready to receive the remaining section 34 of the hub. This is shown in Figs. 16 and 17 and is formed in a manner essentially similar to the formation delineated in Figs. 11 and 12 in connection with the embodiment of Figs. 9 to 13. The section of tubing 35 has its end flared to form flange 40 and the attaching surface 37. Any known methods of securement may be used between the flared end flange 40 of the section 34 and the face of the flange 31, but the arc welding 38—39 is preferred as clearly indicated in Fig. 18. In this embodiment, therefore, it will be observed that both sections of the barrel, 32 and 34, are formed of sections of tubing the adjoining and inter-welded ends of which are flared and arc welded together.

The ring 45 which constitutes the main body of plunger 31 is shown in Figs. 22 and 23 as being stamped from plate stock. It may be, if desired, welded to 34 instead of 32 as indicated in dotted lines of Fig. 18.

My invention is susceptible of yet further modifications, the three or four herein delineated indicating that susceptibility. The claims which follow interpreted in the generic spirit of the invention should cover all of its modifications.

What I claim as new and useful and desire to protect by Letters Patent is:—

1. The method of forming flanged hubs which consists in separately fabricating the flange and that part of the hub barrel lying on one side thereof, flaring the end of a tubular section, and butt welding the flared end of the tubular section substantially to the cornice of the flanged section.

2. The method of making hubs which consists in forming the root of the flange only with that part of the main body of the hub on one side thereof, and thereafter butt welding to the root in ring form the remainder of the flange, and butt welding another flared main barrel section on the opposite side of said flange from the one.

In testimony whereof he hereunto affixes his signature.

CAROLUS L. EKSERGIAN.